United States Patent Office 2,824,664
Patented Feb. 25, 1958

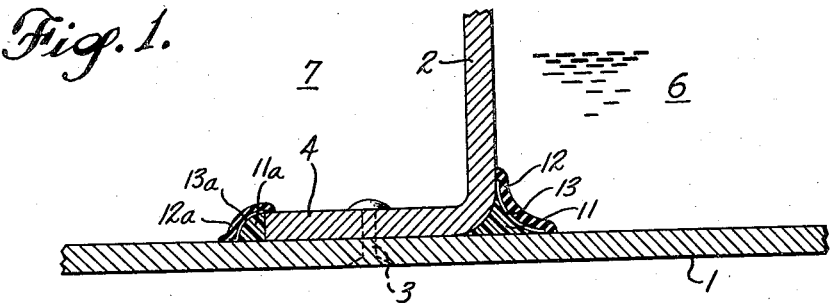
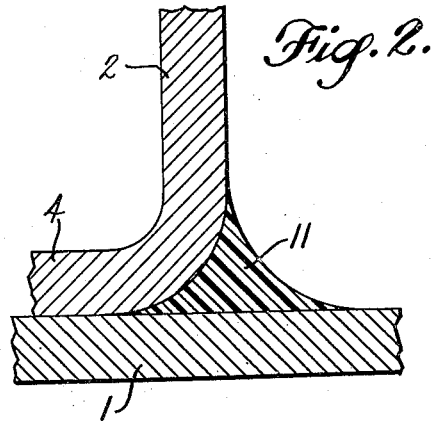
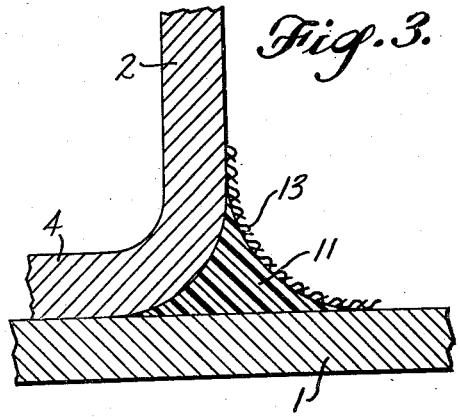
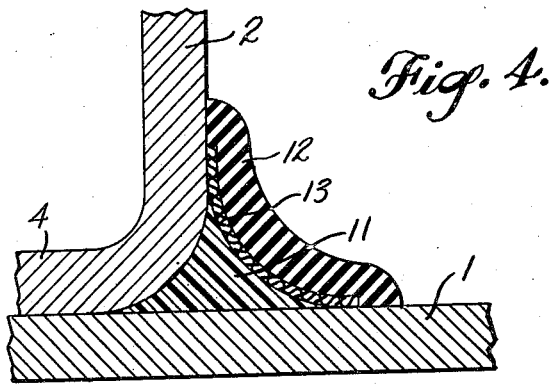

2,824,664
FLAME-RESISTANT SEAL FOR FUEL TANKS

Charles Kenneth French and Robert J. Dunsmoor, Seattle, Wash., assignors to Boeing Airplane Company, Seattle, Wash., a corporation of Delaware Application March 5, 1956, Serial No. 569,651

2 Claims. (Cl. 220—81)

Fire is an ever-present hazard in the vicinity of fuel tanks, and is especially to be guarded against in integral airplane fuel tanks, for an explosion in such an enclosed space may wreck the airplane structure. Integral airplane fuel tanks are formed by the joining of metal bulkheads, constituting one wall, to structure such as the metal wing skin, constituting a second wall, to define wet bays and dry bays, and to separate the one from the other. The sealing of such joints is particularly necessary, since they are subject to a variety of stresses, and the abutting metal walls are not readily structurally joined uninterruptedly, hence such a joint must be sealed by a sealant compound applied along the joint.

The sealant that has been found most suitable is a polysulfide synthetic rubber such as Thiokol. This can be applied along such joints in plastic or semi-liquid form by a sealant gun, and cures and hardens adequately on standing exposed to air. It is highly compatible with the fuel, in the sense that it is chemically and physically unaffected thereby, and the fuel does not affect the integrity of its seal, but it has the grave objection that it burns readily in the presence of flame, or at best, becomes liquid and runs out of the joint. Such destruction of a Thiokol seal would permit fuel to leak, in increasing quantities, from a wet bay into a dry bay wherein are flames. What might have been merely a flash fire thus becomes a totally destructive holocaust, and will probably cause an explosion.

The present invention provides a means of utilizing the advantages of the Thiokol sealant, while at the same time eliminating its objectionable characteristics. This is accomplished by coating the exposed surfaces of the Thiokol bead with a second sealant, such as is also compatible with the fuel, and adheres to the metal walls, but which may not be applicable as a primary sealant with the same ease nor effect, but which has the important property of being inherently indestructible (even though it may char somewhat) under the influence of the heat of a fuel fire. PXU 2036, a flame-resistant Neoprene, another synthetic rubber composition, is well suited for use as the exterior coating, and constitutes a flame or vapor barrier, preventing access of flames to the Thiokol primary sealant bead, hence preserving the seal which the latter affords.

Moreover, it has been found that the integrity of such a composite seal is much improved by the interposition, between the sealant bead of Thiokol and the coating of Neoprene, of a web of material, preferably in woven form, which is inherently unaffected by flames or by the heat generated by burning fuel. A tape of woven, closemesh glass cloth has been found well suited for the purpose. Apparently it partially embeds itself in the exposed surface of the Thiokol bead, if the glass cloth web is applied before the Thiokol sets, and the Neoprene, applied by brushing or spraying, penetrates the meshes of the glass cloth, so that the latter acts as a binder and skeleton to retain the protective relationship of the Neoprene to the Thiokol, and so to retain the sealant disposition of the Thiokol along the joint, despite any tendency of the heat to plasticize or to char either or both sealants.

The details of application and construction of such a joint are illustrated in the accompanying drawings in a typical form.

Figure 1 is a transverse sectional view of such a joint, completed and sealing a dry bay at the left from a wet bay at the right.

Figure 2 is a similar view, showing the first step in the formation of such a joint, and Figures 3 and 4 are like views, showing successive steps.

The wall 1 may be the exterior skin of an airplane wing, and the wall 2 a bulkhead. These are joined, as by rivets 3 or the like through the wall 1 and the flange 4 of wall 2, where they abut, and so define the wet bay 6 for containing the liquid fuel from the dry bay 7. It is this joint, and others like it, which must be sealed, to prevent escape of liquid and volatile fuel into the dry bay 7 from the wet bay 6. Such a seal, moreover, must maintain its integrity even though a small accumulation of fuel in the dry bay may become ignited.

The Thiokol or like primary sealant is shown at 11, Figure 2. It is applied while plastic, or semi-liquid, from a sealant gun of known type, and is laid as a bead along the joint. It may be, and preferably is, applied both interiorly of the wet bay, and exteriorly thereof, as indicated at 11a. It soon cures upon standing at room temperature. Before it is wholly cured it is coated with a coat of the flame-resistant Neoprene, shown at 12 and at 12a, which can best be applied by brushing or spraying. First, however, it is much preferred that a web of inherently flame-proof material, such as the close-mesh woven glass tape at 13 or at 13a, be laid as in Figure 3 along the still plastic Thiokol bead, and pressed thereto sufficiently that its meshes embed themselves partially at least in the Thiokol sealant bead. Thereafter, when the Neoprene coating is applied as in Figure 4, it will penetrate and embed itself within the meshes at the opposite surface of the glass tape. By preference the glass tape at its edges extends beyond the edges of the Thiokol bead, into contact with the metal walls 1 and 2, and the Neoprene coating in like manner overlies the edges of the glass tape, and bonds to the walls 1 and 2, completely housing in the Thiokol bead.

Should a fire ensue, whether in the wet bay 6 or in the dry bay 7, the flames have access only to the Neoprene coating 12 or 12a, which, being flame-resistant or subject at most to charring, continues to contain and hold in place the primary sealant, the Thiokol bead, and to some degree shields the latter from the heat of the flames. The glass tape acts somewhat as a thermal insulator, but is especially useful in retaining its bond with both the Thiokol and the Neoprene, and as a skeleton to retain the forms thereof, and their position wherein the Thiokol continues to function as a sealant. In consequence, unless the fire generates so much heat as to destroy the integrity of the metal elements of the tank or of the joint, the seal remains secure and leakage of fuel to feed the fire is prevented.

We claim as our invention:

1. A flame-resistant seal for the joint of an integral airplane fuel tank, wherein one wall joins a second wall to separate a dry bay from a wet bay, comprising two beads of Thiokol or the like applied in plastic form along the interior and along the exterior of such joint, respectively, a small-mesh glass cloth web in the form of a tape applied to and partially embedded within the exposed surface of each Thiokol bead, and at its edges extending beyond the bead's edges into contact with the walls, and a coating of Neoprene or the like likewise applied in plastic form to and partially embedding the exposed surface of each glass mesh tape, and at its edges extending beyond the tape's edges into contact with the walls.

2. A flame-resistant seal for the joint of an airplane fuel tank or the like, wherein one wall joins a second wall, comprising a bead of polysulfide synthetic rubber composition, such as Thiokol, applied to the two walls along the joint, a coating of a flame-resistant synthetic rubber composition, such as Neoprene, likewise applied along the joint, overlying the exposed surfaces of the Thiokol bead and protecting the latter from access of flame, and a glass cloth mesh overlying the Thiokol bead and underlying the Neoprene coating.

References Cited in the file of this patent

UNITED STATES PATENTS

| | | |
|---|---|---|
| 901,534 | Hamlin | Oct. 20, 1908 |
| 2,439,562 | Cunningham | Apr. 13, 1948 |
| 2,471,500 | Stewart et al. | May 31, 1949 |
| 2,506,728 | McGrath | May 9, 1950 |
| 2,710,113 | Pritchard | June 7, 1955 |